United States Patent
Arumugam et al.

(10) Patent No.: US 12,234,026 B2
(45) Date of Patent: Feb. 25, 2025

(54) AIRCRAFT FLAP MALFUNCTION DETECTION AND LANDING ASSIST SYSTEM AND METHOD

(71) Applicant: HONEYWELL INTERNATIONAL INC., Charlotte, NC (US)

(72) Inventors: Shobana Arumugam, Bangalore (IN); Sripathi Ramachandra, Bangalore (IN); Randy Moore, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 262 days.

(21) Appl. No.: 17/663,911

(22) Filed: May 18, 2022

(65) Prior Publication Data

US 2023/0373653 A1    Nov. 23, 2023

(51) Int. Cl.
*B64D 45/00* (2006.01)
*B64D 45/04* (2006.01)
(Continued)

(52) U.S. Cl.
CPC ......... *B64D 45/0005* (2013.01); *B64D 45/04* (2013.01); *G05D 1/0676* (2013.01); *G08G 5/025* (2013.01)

(58) Field of Classification Search
CPC .......... B64D 45/0005; B64D 2045/001; B64D 2045/0085; G05D 1/0676; G08G 5/025; G08G 5/0056; G08G 5/0039
See application file for complete search history.

(56) References Cited

U.S. PATENT DOCUMENTS

| 5,113,346 A | 5/1992 | Orgun et al. |
| 6,609,421 B2 | 8/2003 | Cronin et al. |

(Continued)

FOREIGN PATENT DOCUMENTS

IN    202041001797 A    1/2020

OTHER PUBLICATIONS

FAA, "Airplane Flying Handbook", FAA-H-8083-3C, Sections "Front Matter", Chapter 9 "Approaches and Landings", Chapter 18 "Emergency Procedures" provided in single combined PDF, retrieved from web Apr. 2024, URL: <https://www.faa.gov/regulations_policies/handbooks_manuals/aviation/airplane_handbook> (Year: 2022).*

(Continued)

*Primary Examiner* — Jason Holloway
*Assistant Examiner* — Benjamin J Brosh
(74) *Attorney, Agent, or Firm* — Lorenz & Kopf LLP (57) ABSTRACT

An aircraft flap malfunction detection and landing assist system and method includes supplying flap status data, from a flap status data source, that indicates at least aircraft flap configuration and operability, supplying aircraft state data, from an aircraft state data source, that indicates at least aircraft weight, aircraft speed, and aircraft position, supplying weather data, from a weather data source, that indicates current weather at a landing runway, processing, in a processing system the flap status data to determine if at least one flap is inoperable and, upon determining that the at least one flap is inoperable, processing the flap status data, the aircraft state data, and the weather data to selectively generate, and command a display device to render, at least one of forward slip landing parameters or side slip landing parameters.

20 Claims, 3 Drawing Sheets

(51) Int. Cl.
*G05D 1/00* (2006.01)
*G08G 5/02* (2006.01)

(56) References Cited

U.S. PATENT DOCUMENTS

| | | |
|---|---|---|
| 6,681,180 B2 | 1/2004 | Bevly et al. |
| 8,332,083 B1 | 12/2012 | Mccusker |
| 8,475,127 B2 | 7/2013 | Unker et al. |
| 8,798,817 B2 | 8/2014 | O'Dell et al. |
| 8,814,082 B2 | 8/2014 | Schievelbusch et al. |
| 8,989,953 B2 | 3/2015 | Catt et al. |
| 9,045,220 B2 | 6/2015 | Yamasaki |
| 9,302,763 B2 | 4/2016 | Catt et al. |
| 9,418,561 B2 | 8/2016 | Gannon et al. |
| 9,646,505 B2 | 5/2017 | Ali et al. |
| 2013/0075535 A1 | 3/2013 | Brot et al. |
| 2014/0336865 A1* | 11/2014 | Catt .......... B64D 45/0005 701/34.2 |
| 2015/0120098 A1* | 4/2015 | Catalfamo .......... G08G 5/0021 701/16 |
| 2017/0050722 A1* | 2/2017 | Jones .......... B64D 45/00 |
| 2019/0004081 A1* | 1/2019 | Tremblay .......... G08G 5/0047 |
| 2021/0109547 A1 | 4/2021 | Clark |
| 2023/0192312 A1* | 6/2023 | Berger .......... B64D 43/02 701/16 |

OTHER PUBLICATIONS

Borello, Lorenzo, et al."Flap Failure and Aircraft Controllability: Developments in Asymmetry Monitoring Techniques," Journal of Mechanical Science and Technology 28 (11) (Jun. 27, 2014), 4593-4603.

* cited by examiner

AIRCRAFT FLAP MALFUNCTION DETECTION AND LANDING ASSIST SYSTEM AND METHOD

TECHNICAL FIELD

The present invention generally relates to an aircraft landing assist system, and more particularly relates to an aircraft flap malfunction detection and landing assist system and method.

BACKGROUND

During the approach phase of an aircraft, the flaps are typically extended to ensure a relatively smooth landing and relatively short landing roll. This is because the flaps provide greater lift and permit lower landing speeds and provide greater drag thereby permitting a relatively steep descent angle without an increase in airspeed. Flap extension can be a sensitive and relatively important operation and it is influenced by other landing parameters, such as engine power, pitch variations, descent angle, touchdown point etc.

For example, if the aircraft pilot determines that the aircraft may overshoot the desired touch down point, in addition to extending the flaps, the pilot may also need to reduce engine power and lower the pitch altitude to implement a steeper approach. Conversely, if the pilot determines that the aircraft may undershoot the desired touch down point, the pilot may shallow the approach by increasing engine power and adjusting the pitch for the desired descent angle. However, the pilot will not retract the flaps to correct the undershoot, since this would rapidly decrease lift and cause the aircraft to sink even more rapidly.

As is generally known, a flapless (or "clean" or "flat") approach is a method of landing an aircraft without the use of flaps. This maneuver is typically deemed relatively risky, especially for commercial aircraft. Nonetheless, there have been instances in which a flapless approach has been necessary due to one or more malfunctioning flaps. In many of these cases, the pilot ends up performing either a forward slip or a side slip maneuver. As is generally known, forward slips are implemented to lose altitude and side slips are implemented to compensate for lateral drift (cross winds) while landing.

As may be appreciated, when one or more flaps malfunction during approach, prioritizing the available options can be a complex procedure. It involves considerations of numerous aircraft specific limitations/recommendations while determining the available options. Adverse weather conditions and traffic adds to the complexity.

Hence, there is a need for a system and method that can detect flap malfunctions and that can provide precise predictions and guidance to the pilot with the available options for safe and smooth landing whenever there is one or more malfunctioning of flaps. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an aircraft flap malfunction detection and landing assist system includes a flap status data source, an aircraft state data source, a weather data source, a display device, and a processing system. The flap status data source is operable to supply flap status data that indicates at least aircraft flap configuration and operability. The aircraft state data source is operable to supply aircraft state data that indicates at least aircraft weight, aircraft speed, and aircraft position. The weather data source is operable to supply weather data that indicates current weather at a landing runway. The processing system is coupled to receive at least the flap status data, the aircraft state data, and the weather data, and is in operable communication with the display device. The processing system configured to: (i) process the flap status data to determine if at least one flap is inoperable, and (ii) upon determining that the at least one flap is inoperable, to process the flap status data, the aircraft state data, and the weather data to selectively generate, and command the display device to render, at least one of forward slip landing parameters or side slip landing parameters.

In another embodiment, an aircraft flap malfunction detection and landing assist system includes a display device and a processing system. The processing system is in operable communication with the display device and is operable to receive at least flap status data, aircraft state data, and weather data, the processing system configured to: (i) process the flap status data to determine if at least one flap is inoperable, and (ii) upon determining that the at least one flap is inoperable, to process the flap status data, the aircraft state data, and the weather data to selectively generate, and command the display device to render, at least one of forward slip landing parameters or side slip landing parameters. Wherein the flap status data includes data that indicates at least aircraft flap configuration and operability, the aircraft state data includes data that indicates at least aircraft weight, aircraft speed, and aircraft position, and the weather data includes data that indicates current weather at a landing runway.

In yet another embodiment, an aircraft flap malfunction detection and landing assist method includes supplying flap status data, from a flap status data source, that indicates at least aircraft flap configuration and operability, supplying aircraft state data, from an aircraft state data source, that indicates at least aircraft weight, aircraft speed, and aircraft position, supplying weather data, from a weather data source, that indicates current weather at a landing runway, processing, in a processing system the flap status data to determine if at least one flap is inoperable and, upon determining that the at least one flap is inoperable, processing the flap status data, the aircraft state data, and the weather data to selectively generate, and command a display device to render, at least one of forward slip landing parameters or side slip landing parameters.

Furthermore, other desirable features and characteristics of the aircraft flap malfunction detection and landing assist system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
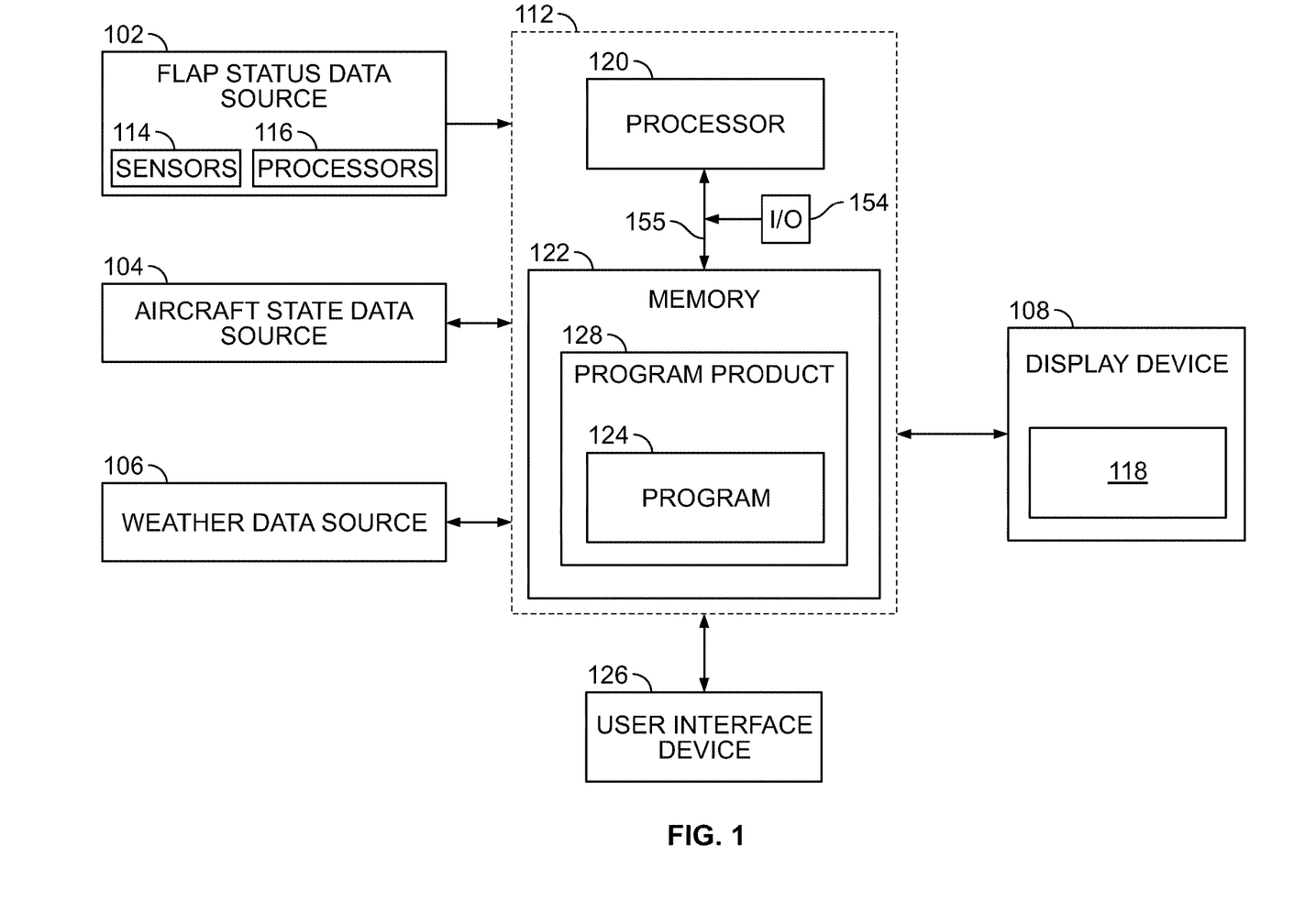
FIG. 1 depicts a functional block diagram of one embodiment of an aircraft flap malfunction detection and landing assist system.

Referring to FIG. 1, a functional block diagram of one embodiment of an aircraft flap malfunction detection and landing assist system 100 is depicted. The system 100 is at least partially disposed in, or on, an aircraft 110, and includes at least a flap status data source 102, an aircraft state data source 104, a weather data 106 source, a display device 108, and a processing system 112. The aircraft 110 may be any one of numerous types of fixed-wing aircraft that are equipped with flight control surfaces, such as flaps.

The flap status data source 102 may be variously configured and implemented. For example, in the depicted embodiment the flap data source 102 includes one or more flap position sensors 114 associated with each aircraft flap and/or one or more flap health processors 116. Each flap position sensor 114 is configured to sense the position of each flap and supply the sensed position data to the one or more of the flap health processors 116. The one or more flap health processors 116 are configured to process at least the flap position data to generate and supply flap status data to the processing system 112. The one or more flap health processors 116 may also process additional data, such as aircraft state data (described below) historical information, maintenance inputs, etc. to generate and supply the flap status data. Regardless of how the flap status data source 102 is specifically implemented, the flap status data it supplies includes data that indicates at least aircraft flap configuration and operability.

The aircraft state data source 104 generally provides, for each of a variety of aircraft 100 subsystems, current status/state and performance data. Some examples of aircraft state data include data that indicates at least aircraft weight, aircraft speed, and aircraft position. Some additional aircraft state data may include data that indicates aircraft flight mode, engine status, engine thrust level, fuel level, braking status, and temperature control system status, just to name a few. As may be appreciated, the aircraft state data source 104 may be variously implemented and may include a variety of components, such as, for example, various on-board sensors, devices, instruments (such as on-board radar, radar altimeter, a global positioning system (GPS)), and software, operable to detect and supply the aircraft state data.

The weather data source 106 is operable to supply weather data that indicates current weather at a landing runway. It will be appreciated that the weather data source 106 may be variously implemented and may include, for example, onboard data sensors, such as onboard weather radar, and/or a source for meteorological terminal aviation weather reports (METARS), and/or a datalink or satellite communications system for wirelessly receiving weather information from a remote source.

The display device 108 is responsive to display commands to render one or more images. In this regard, the display device 108 includes a display 118 on which the one or more images are rendered. Various ones of the images that are rendered will be described in more detail further below. It will be appreciated that the display device 108 may be implemented using one or more electronic display devices, such as a multi-function display (MFD) or a multi-function control display unit (MCDU), configured as any combination of: a head up display (HUD), an alphanumeric display, a vertical situation display (VSD), and a lateral navigation display (ND).

The processing system 112 is in operable communication with the flap status data source 102, the aircraft state data source 104, the weather data 106 source, and the display device 108, and implements numerous and varied functions, which are described further below. As used herein, the term "processing system" refers to any means for facilitating communications and/or interaction between the elements of the system 100 and performing additional processes, tasks and/or functions to support operation of the system 100, as described herein. In various embodiments, the searchlight processing system 108 may be any hardware, software, firmware, electronic control component, processing logic, and/or processor device, individually or in any combination. Depending on the embodiment, the searchlight processing system 108 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

Accordingly, in FIG. 1, an embodiment of the processing system 108 is depicted as a computer system comprising a processor 120 and a memory 122. The processor 120 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The memory 122 may comprise RAM memory, ROM memory, flash memory, registers, a hard disk, or another suitable non-transitory short or long-term storage media capable of storing computer-executable programming instructions or other data for execution. The memory 122 may be located on and/or co-located on the same computer chip as the processor 120. Generally, the memory 122 maintains data bits and may be utilized by the processor 120 as storage and/or a scratch pad during operation. Specifically, the memory 122 may store instructions and applications embodied as a novel program 124. Information in the memory 122 may be organized and/or imported from an external source during an initialization step of a process; it may also be programmed via a user interface device 126. During operation, the processor 120 loads and executes the novel program 124 contained within the memory 122 and, as such, controls the general operation of the searchlight processing system 108 as well as the system 102.

The novel program 124 includes rules and instructions which, when executed, convert the processor 120/memory 122 configuration into a novel aircraft flap malfunction detection and landing assist processing system 112 that performs the functions, techniques, and processing tasks associated with the operation of the system 100. The novel program 124 and associated stored variables may be stored in a functional form on computer readable media, for example, as depicted, in memory 122. While the depicted exemplary embodiment of the processing system 112 is described in the context of a fully functioning computer system, those skilled in the art will recognize that the mechanisms of the present disclosure are capable of being distributed as a program product 128.

As a program product 128, one or more types of non-transitory computer-readable signal bearing media may be used to store and distribute the program 124, such as a non-transitory computer readable medium bearing the program 124 and containing therein additional computer instructions for causing a computer processor (such as the processor 120) to load and execute the program 124. Such a program product 128 may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized as memory 122 and as program product time-based viewing of clearance requests in certain embodiments.

In various embodiments, the processor 120 and memory 122 of the processing system 112 may be communicatively coupled (via a bus 155) to an input/output (I/O) interface 154. The bus 155 serves to transmit programs, data, status and other information or signals between the various components of the searchlight processing system 108. The bus 155 can be any suitable physical or logical means of connecting computer systems and components. This includes, but is not limited to, direct hard-wired connections, fiber optics, infrared and wireless bus technologies.

The I/O interface 154 enables intra processing system 112 communication, as well as communications between the processing system 112 and other system 100 components, and between the processing system 112 and non-illustrated external data sources. The I/O interface 154 may include one or more network interfaces and can be implemented using any suitable method and apparatus. In various embodiments, the I/O interface 154 is configured to support communication from an external system driver and/or another computer system.

Regardless how it is specifically implemented, the processing system 112 is coupled to receive at least the flap status data from the flap status data source 102, the aircraft state data from the aircraft state data source 104, and the weather data from the weather data source 106. The processing system 112 is configured to process the flap status data to determine if at least one flap is inoperable. If the processing system 112 does determine that at least one flap is inoperable, it is further configured to process the flap status data, the aircraft state data, and the weather data to selectively generate, and command the display device 108 to render, at least one of forward slip landing parameters or side slip landing parameters.

The processing system 112 only selectively generates at least one of the forward slip landing parameters or the side slip landing parameters because the pilot may be able to capably land the aircraft 110 without invoking either of these procedures. More specifically, the processing system 112 is further configured to generate initial landing trajectory parameters to the landing runway. These initial landing trajectory parameters are based upon the assumption that all of the flaps are operable. Thereafter, if the processing system 112 subsequently determines that at least one flap is inoperable, the processing system 112, as will be described in more detail momentarily, is configured to regenerate the landing trajectory parameters based on the inoperable flap (s). If the processing system 112 determines that the aircraft 110 can be landed using the regenerated landing trajectory parameters, then a regular landing procedure is initiated using the regenerated parameters. However, if the processing system 112 determines that the aircraft 110 cannot be landed using the regenerated landing trajectory parameters, then either the forward slip or side slip procedure may be invoked, and the processing system 112 may thus command the display device 108 to render, as appropriate, the forward slip or side slip landing parameters.

Figure 2:
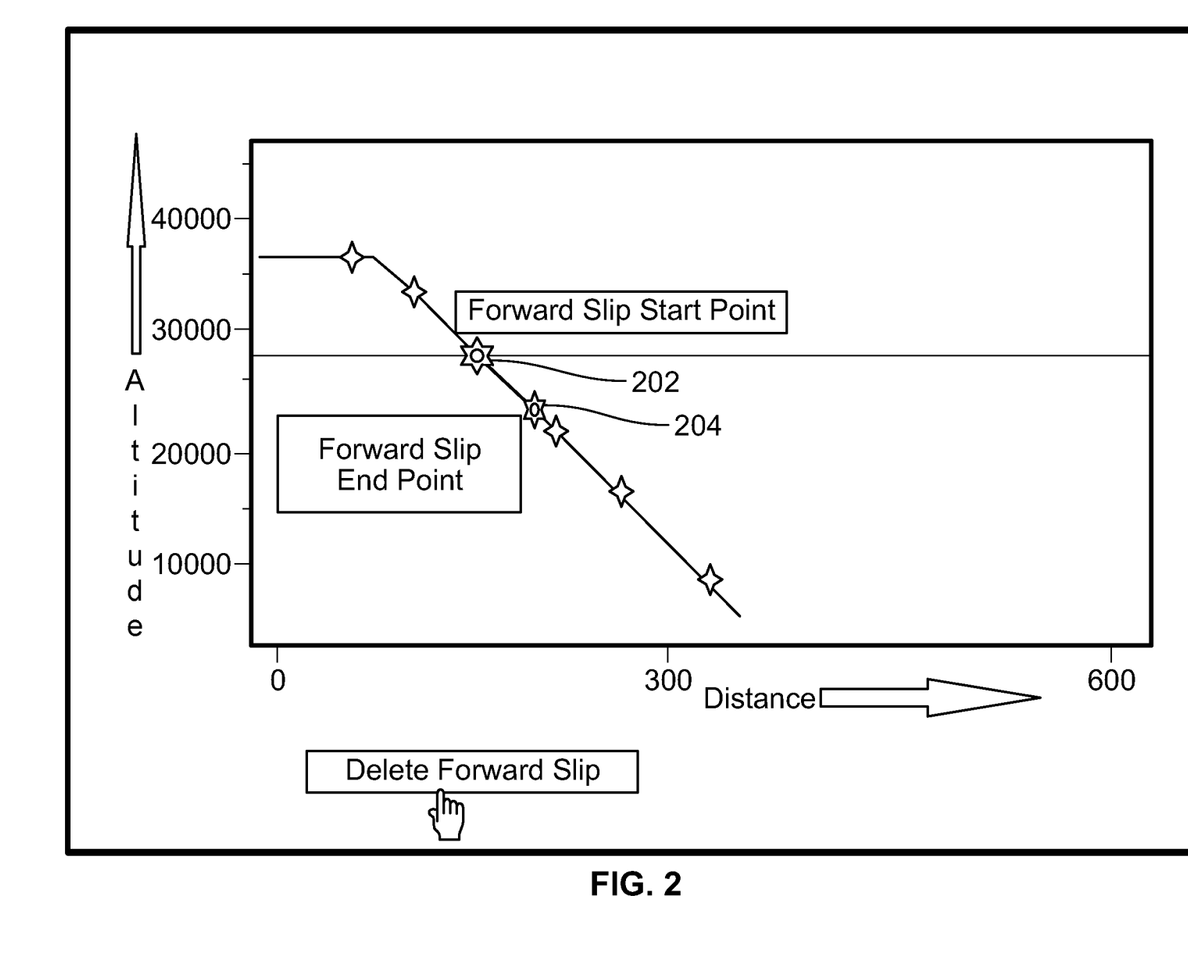
FIG. 2 depicts one example of an image that may be rendered by a display device of the system of FIG. 1.

Before proceeding further, it should be noted that the specific forward slip and side slip landing parameters that are rendered may vary. In one example, which is depicted in FIG. 2, the processing system 112 commands the display device 108 to render at least the start point 202 and the end point 204 of the appropriate landing procedure. It will be appreciated that although FIG. 2 depicts the start and end points 202, 204 for a forward slip landing procedure, the processing system 112 may instead command the display device 108 to render the start and end points for a side slip landing procedure, if it is determined that a side slip landing procedure is appropriate. It will additionally be appreciated that other parameters associated with these landing procedures may also be rendered. For example, approach speed, rate of descent, flap configuration (for the operable flaps), flight path angle, and speed target change anticipation point/region, may also be rendered.

Figure 3:
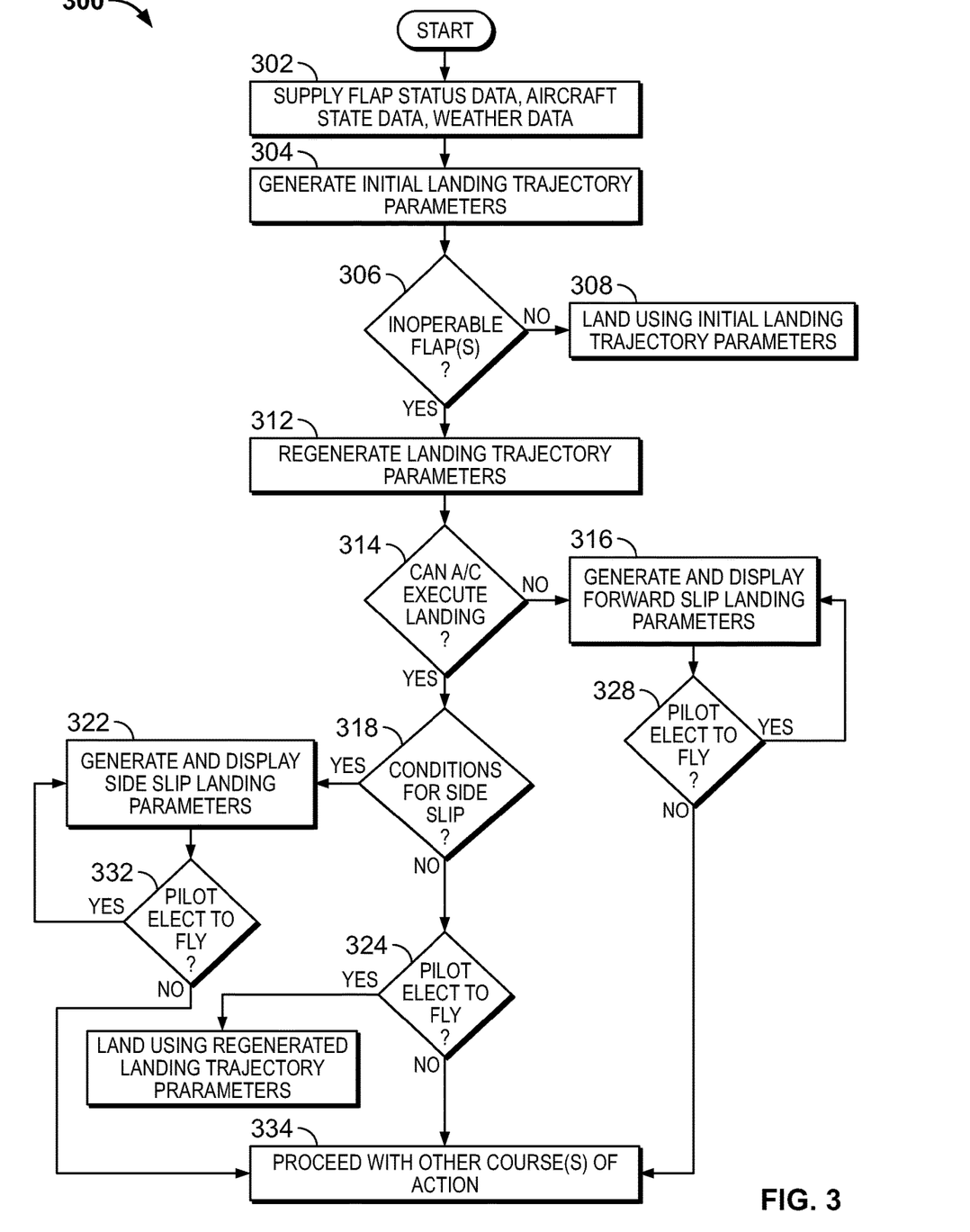
FIG. 3 depicts a process, in flowchart form, of a method that may be implemented in the system of FIG. 1.

Having described the overall functionality of the system 100 generally, a more detailed description of the system operation will be provided. In doing so, a flap malfunction detection and landing assistance method that is implemented in the aircraft flap malfunction detection and landing assist system 100 will be described. The method 300, which is depicted in flowchart form in FIG. 3, represents various embodiments of a method for detecting flap malfunction and providing landing assistance. For illustrative purposes, the following description of method 300 may refer to elements mentioned above in connection with FIG. 1. In practice, portions of method 300 may be performed by different components of the described system 100. It should be appreciated that method 300 may include any number of additional or alternative tasks, the tasks shown in FIG. 3 need not be performed in the illustrated order, and method 300 may be incorporated into a more comprehensive procedure or method having additional functionality not described in detail herein. Moreover, one or more of the tasks shown in FIG. 3 could be omitted from an embodiment of the method 300 if the intended overall functionality remains intact.

The method 300 starts and the processing system 112 is initialized and the system 100 is in operation. The flap status data, the aircraft state data, and the weather data are supplied to the processing system 112 from the flap status data source 102, the aircraft state data source 104, and the weather data source 106, respectively (302). The processing system 112 generates the initial landing trajectory parameters to the landing runway (304), and processes the flap status data to determine if at least one flap is inoperable (306). If no flaps are inoperable, the pilot will proceed with landing using the initial landing trajectory parameters (308). If, however, at least one flap is inoperable, the flap status data, the aircraft state data, and the weather data are processed to regenerate the landing trajectory parameters (312).

The processing system 112 then determines if the aircraft can execute a landing on the landing runway using the regenerated landing trajectory parameters (314). If not, then the processing system 112 generates, and commands the display device 108 to render, the forward slip landing parameters (316). If, on the other hand, the aircraft can execute a landing on the landing runway using the regenerated landing trajectory parameters, the processing system 112 determines if the conditions (e.g., crosswinds predicted during landing) for executing a side slip landing exist (318). If the conditions do exist, then the processing system 112 generates, and commands the display device 108 to render, the side slip landing parameters (322). However, when the aircraft can execute the landing on the landing runway using the regenerated landing trajectory parameters, and the conditions for executing a side slip landing do not exist, then the pilot can elect to proceed or not proceed with regular landing procedures (324, 326).

As FIG. 3 also depicts, when the pilot chooses to not execute the landing using the regenerated landing trajectory parameters, or the pilot does not want to (or is unable to) implement the forward slip procedure or side slip procedure (328, 332), the pilot will have to proceed with one or more other courses of action (334). These other courses of action may include, for example, flying in a holding pattern, conducting a missed approach procedure, and/or declaring an emergency.

The system and method described herein detects flap malfunctions and provides precise predictions and guidance to the pilot with the available options for safe and smooth landing whenever there is one or more malfunctioning of flaps.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft flap malfunction detection and landing assist system, comprising:
    a circuit forming a processing system with a processor;
    a flap status data source comprising flap sensors or flap health processors on an aircraft operable to supply flap status data, the flap status data including data that indicates at least aircraft flap configuration and operability;
    an aircraft state data source having at least one of sensors, radar, and global positioning system (GPS) on the aircraft operable to supply aircraft state data, the aircraft state data including data that indicates at least aircraft weight, aircraft speed, and aircraft position;
    a weather data source operable to supply weather data, the weather data including data that indicates current weather at a landing runway before the aircraft reaches the landing runway;
    a display device on the aircraft; and
    wherein the processing system is communicatively coupled to the weather data source, aircraft state data source, and the flap status data source, wherein the processing system is arranged to receive at least the flap status data, the aircraft state data, and the weather data, and wherein the processing system is in operable communication with the display device, the processing system configured to:
        (i) process the flap status data to determine if at least one flap is inoperable, and
        (ii) upon determining that the at least one flap is inoperable, to process the flap status data, the aircraft state data, and the weather data to selectively generate, and command the display device on the aircraft to render, at least one of forward slip landing parameters or side slip landing parameters.

2. The system of claim 1, wherein the processing system is further configured to:
    generate landing trajectory parameters to the landing runway;
    upon determining that the at least one flap is inoperable, to process the flap status data, the aircraft state data, and the weather data to regenerate the landing trajectory parameters; and
    determine if the aircraft can execute a landing on the landing runway using the regenerated landing trajectory parameters.

3. The system of claim 2, wherein:
    when the aircraft can execute the landing on the landing runway using the regenerated landing trajectory parameters, the processing system is further configured to determine if conditions for executing a side slip landing exist and, if so, generate, and command the display device to render, the side slip landing parameters.

4. The system of claim 3, wherein the conditions for executing a side slip landing include at least a presence of a crosswind predicted to be during the landing on the landing runway.

5. The system of claim 2, wherein:
when the aircraft cannot execute the landing on the landing runway using the regenerated landing trajectory parameters, the processing system is further configured to generate, and command the display device to render, the forward slip landing parameters.

6. The system of claim 1, wherein:
the forward slip landing parameters include at least forward slip start and end points; and
the side slip landing parameters include at least side slip start and end points.

7. The system of claim 1, wherein the weather data source comprises at least one of: onboard weather radar, a terminal weather report, a weather satellite communications system, and a datalink weather communications system.

8. An aircraft flap malfunction detection and landing assist system, comprising:
a display device on an aircraft; and
a processing system on the aircraft having a circuit forming a processor and being in operable communication with the display device and operable to receive at least the flap status data, aircraft state data, and weather data, the processing system configured to:
(i) process the flap status data to determine if at least one flap is inoperable, and
(ii) upon determining that the at least one flap is inoperable, to process the flap status data, the aircraft state data, and the weather data to selectively generate, and command the display device to render, at least one of forward slip landing parameters or side slip landing parameters,
wherein:
the flap status data includes data that indicates at least aircraft flap configuration and operability,
the aircraft state data includes data that indicates at least aircraft weight, aircraft speed, and aircraft position, and
the weather data includes data that indicates current weather at a landing runway before the aircraft reaches the runway.

9. The system of claim 8, wherein the processing system is further configured to:
generate landing trajectory parameters to the landing runway;
upon determining that the at least one flap is inoperable, to process the flap status data, the aircraft state data, and the weather data to regenerate the landing trajectory parameters; and
determine if the aircraft can execute a landing on the landing runway using the regenerated landing trajectory parameters.

10. The system of claim 9, wherein:
when the aircraft can execute the landing on the landing runway using the regenerated landing trajectory parameters, the processing system is further configured to determine if conditions for executing a side slip landing exist and, if so, generate, and command the display device to render, the side slip landing parameters.

11. The system of claim 10, wherein the conditions for executing a side slip landing include at least a prediction of a presence of a crosswind during the landing on the landing runway.

12. The system of claim 9, wherein:
when the aircraft cannot execute the landing on the landing runway using the regenerated landing trajectory parameters, the processing system is further configured to generate, and command the display device to render, the forward slip landing parameters.

13. The system of claim 8, wherein:
the forward slip landing parameters include at least forward slip start and end points; and
the side slip landing parameters include at least side slip start and end points.

14. An aircraft flap malfunction detection and landing assist method, comprising the steps of:
receiving, by a processing system with a circuit forming a processor on an aircraft or communicating with an aircraft, flap status data from a flap status data source comprising flap sensors or flap health processors or both on an aircraft that indicates at least aircraft flap configuration and operability;
receiving, by the processing system, aircraft state data from an aircraft state data source having at least one of sensors, radar, and global positioning system (GPS) that indicates at least aircraft weight, aircraft speed, and aircraft position;
receiving, by the processing system, weather data from a weather data source that indicates current weather at a landing runway before the aircraft reaches the runway;
processing, by the processing system, the flap status data to automatically determine if at least one flap is inoperable; and
upon determining that the at least one flap is inoperable, processing, by the processing system, the flap status data, the aircraft state data, and the weather data to selectively generate, and command a display device on the aircraft to render, at least one of forward slip landing parameters or side slip landing parameters.

15. The method of claim 14, further comprising:
generating, in the processing system, initial landing trajectory parameters to the landing runway;
upon determining that the at least one flap is inoperable, processing the flap status data, the aircraft state data, and the weather data to regenerate the landing trajectory parameters;
determining, in the processing system, if the aircraft can execute a landing on the landing runway using the regenerated landing trajectory parameters.

16. The method of claim 15, wherein:
when the aircraft can execute the landing on the landing runway using the regenerated landing trajectory parameters, the method further comprises determining, in the processing system, if conditions for executing a side slip landing exist and, if so, generating, and commanding the display device to render, the side slip landing parameters.

17. The method of claim 16, wherein the conditions for executing a side slip landing include at least a presence of a crosswind during the landing on the landing runway.

18. The method of claim 15, wherein:
when the aircraft cannot execute the landing on the landing runway using the regenerated landing trajectory parameters, the method further comprises generating, and commanding the display device to render, the forward slip landing parameters.

19. The method of claim 14, wherein:
the forward slip landing parameters include at least forward slip start and end points; and
the side slip landing parameters include at least side slip start and end points.

20. The method of claim 14, wherein the weather data source comprises at least one of: onboard weather radar, a terminal weather report, a weather satellite communications system, and a datalink weather communications system.

* * * * *